(12) United States Patent
Gopala Suraj et al.

(10) Patent No.: US 12,371,199 B2
(45) Date of Patent: Jul. 29, 2025

(54) RE-CONFIGURABLE UNMANNED AERIAL VEHICLE

(71) Applicant: International Institute of Information Technology, Hyderabad, Hyderabad (IN)

(72) Inventors: Bonagiri Venkata Sai Gopala Suraj, Rajahmundry (IN); Spandan Roy, Hyderabad (IN); K. Madhava Krishna, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 0 days.

(21) Appl. No.: 18/009,716

(22) PCT Filed: Jun. 10, 2021

(86) PCT No.: PCT/IN2021/050565
§ 371 (c)(1),
(2) Date: Dec. 10, 2022

(87) PCT Pub. No.: WO2021/250701
PCT Pub. Date: Dec. 16, 2021

(65) Prior Publication Data
US 2023/0348118 A1   Nov. 2, 2023

(30) Foreign Application Priority Data

Jun. 10, 2020   (IN) .............................. 202041024431

(51) Int. Cl.
B64U 20/70   (2023.01)
B64D 1/08    (2006.01)
(Continued)

(52) U.S. Cl.
CPC ............... B64U 20/70 (2023.01); B64D 1/08 (2013.01); B64U 10/14 (2023.01); B64U 30/20 (2023.01);
(Continued)

(58) Field of Classification Search
CPC ............... B64U 24/70; B64U 2101/66; B64U 2201/20; B64U 10/14; B64C 1/08; B64D 1/08
See application file for complete search history.

(56) References Cited

U.S. PATENT DOCUMENTS 8,950,698 B1 * 2/2015 Rossi .................. B64C 29/0033
                                                         244/63
2019/0112045 A1 * 4/2019 Zhang .................. B64C 39/024
(Continued)

FOREIGN PATENT DOCUMENTS

KR        101700247 B1 *  7/2016
WO    WO-2019116323 A1 *  6/2019  ............... B64C 1/22
WO    WO-2019205140 A1 * 10/2019  .............. B64C 27/08

*Primary Examiner* — Joshua D Huson
*Assistant Examiner* — Peter A Taraschi (57) ABSTRACT

An embodiment herein provides a re-configurable unmanned aerial vehicle that re-configures its shape based on the shape, size, weight of a payload, and efficiently performs payload delivery in real-time. The re-configurable unmanned aerial vehicle includes one or more rotor units placed at corners and is connected by one or more scissor units. The re-configurable unmanned aerial vehicle approaches the payload in a first location, and analyses the position and dimension of the payload with a camera, that enables the one or more scissor units to adjust its length by at least one elongation or compression following size and shape of the payload and fit the payload within the re-configurable unmanned aerial vehicle. The re-configurable unmanned aerial vehicle takes off carrying the payload from the first location and lands at a second location.

5 Claims, 8 Drawing Sheets

(51) Int. Cl.
  *B64U 10/14* (2023.01)
  *B64U 30/20* (2023.01)
  *B64U 70/83* (2023.01)
  *B64U 101/20* (2023.01)
  *B64U 101/30* (2023.01)
  *B64U 101/60* (2023.01)
  *B64U 101/66* (2023.01)

(52) U.S. Cl.
  CPC .......... *B64U 70/83* (2023.01); *B64U 2101/20* (2023.01); *B64U 2101/30* (2023.01); *B64U 2101/60* (2023.01); *B64U 2101/66* (2023.01); *B64U 2201/20* (2023.01)

(56) References Cited

U.S. PATENT DOCUMENTS

| | | | |
|---|---|---|---|
| 2019/0276140 A1* | 9/2019 | Poltorak | B60W 20/10 |
| 2019/0389080 A1* | 12/2019 | Chundi | B25J 18/02 |
| 2020/0070968 A1* | 3/2020 | Prager | B64U 20/30 |
| 2021/0163120 A1* | 6/2021 | Jarvis | B64U 10/16 |

\* cited by examiner

RE-CONFIGURABLE UNMANNED AERIAL VEHICLE

BACKGROUND

Technical field

The embodiments herein generally relate to payload transport systems, and more particularly, to an unmanned aerial vehicle that is re-configurable based on payloads to deliver the payloads efficiently and rapidly.

Description of the Related Art

An unmanned aerial vehicle (UAV) is defined as a powered, aerial vehicle without a human operator that uses aerodynamic forces to lift the vehicle and fly autonomously or piloted remotely by the human operator. The UAV can be used to carry a lethal or nonlethal payload. Drones are a kind of robot also often called Unmanned Aerial Vehicles (UAVs) that can autonomously fly in natural and man-made environments. These robots are designed in several sizes and specifications concerning their applications, and also can often be associated with defense mechanisms. There is a wide range of applications where humans can be replaced by drones that include transportation, civilian tasks, communication, agriculture, disaster mitigation, environment preservation, and surveillance. A drone with perceptual intelligence is required to negotiate complex human environments.

Nowadays drone delivery is being used in civilian aspects like healthcare, food delivery, and postal payload or product deliveries. When drone delivery is utilized for civilian tasks, existing systems have several limitations like payload weight (approx. 2 lbs), shape, limited flight range (approx. 12 miles), flight time, a fixed chassis that allows regular payload for which center of mass of the payload is obvious. The existing systems allow the payload to be attached to the drone quadrotor and then the drone is flown to the destination. But when it comes to irregularly shaped payloads for which the center of mass doesn't can be calculated, the existing system is not preferred.

The existing systems will be efficient in payload delivery if the center of mass (COM) of the attached payload is near the drone's COM. The existing systems are not preferred if the payload is elongated or irregularly shaped since some motors may exert more force than other motors, if not attached properly due to human errors, during the payload delivery which results in higher current withdrawal, controllability issues, and other inefficiencies. This is a common scenario as not all payloads have COM similar to the drone to be carried and result in higher current withdrawal, controllability issues, and other inefficiencies during their delivery. Another drawback of the existing systems is the need for an additional gripping mechanism like a mechanical gripper, electromagnet, or a box to place the payloads on the drone. The use of a mechanical gripper and box exert restriction on the maximum size of payload that the drone can carry. Using electromagnets to hold a payload implies payload needs to be made of magnetic material. Also, the mechanical and electromagnetic gripping mechanisms require extra active energy to hold the payload on the drone. Electromagnet gripper is susceptible to vibrations. Overall, the additional gripping mechanisms place constraints on the payloads to be carried. The existing design is not preferable in a commercial logistics scenario where the drone has to deliver a huge number of payloads daily as small inefficiencies can occur due to payloads having different shapes, sizes, etc. These small inefficiencies can pile up to create a largely inefficient process and can negatively affect the commercial logistics scenario.

Accordingly, there remains a need for an unmanned aerial vehicle that is re-configurable to deliver payloads efficiently and rapidly to overcome the drawbacks associated with current systems.

SUMMARY

In view of the foregoing, an embodiment herein provides a re-configurable unmanned aerial vehicle that re-configures its shape based on a shape and a size of payloads for delivering the payloads in real-time. The re-configurable unmanned aerial vehicle includes one or more rotor units, one or more scissor units, and one or more pipes. The one or more rotor units include one or more battery slots, and a communication module that is configured to communicate data to a remote device and receive commands from the remote device. The one or more scissor units that are connected with the one or more rotor units, adjusts a length and an orientation of the re-configurable unmanned aerial vehicle based on the shape and the size of the payloads when the one or more rotor units receive the commands from the remote device. The one or more scissor units are configured to perform at least one of elongation or compression of the one or more scissor units to fit the payloads within the re-configurable unmanned aerial vehicle using a scissor mechanism. The one or more pipes include one or more brushless Direct Current (DC) motors and one or more propellers to deliver the payloads from a first location to a second location in the real-time.

In some embodiments, each of the one or more rotor units include any of a flight controller, a parachute system, a camera, and a Global Positioning System (GPS) module or a Real-Time Kinematic (RTK), that distributes among the one or more rotor units to control the re-configurable unmanned aerial vehicle.

In some embodiments, the camera analyses at least one of a position of the payload, a length of the payload, or a breadth of the payload when the re-configurable unmanned aerial vehicle approaches the payload.

In some embodiments, the one or more rotor units include one or more actuators that adjust the length of the one or more scissor units based on the size and the shape of the payload within the re-configurable unmanned aerial vehicle.

In some embodiments, the length of the one or more scissor units is actuated using the one or more actuators to elongate and compress the one or more scissor units.

In some embodiments, the one or more actuators include one or more linear actuators to control a length of the scissor mechanism. The one or more scissor units perform at least one of the elongation or compression of the one or more scissor units using a parallel scissor mechanism.

In some embodiments, the one or more scissor units include a locking mechanism that locks the one or more scissor units when the payload fits within the re-configurable unmanned aerial vehicle.

In some embodiments, the re-configurable unmanned aerial vehicle re-configures into one or more different shapes to match with the shape and the size of the payload using degrees of freedom in changing the length of the one or more scissor units.

The one or more scissor units of the re-configurable unmanned aerial vehicle can be added/removed to change the maximum range of expansion, which provides modularity. The scissor mechanism in the one or more scissor units allows a high range of expansion. The re-configurable unmanned aerial vehicle grasps a very large object by expanding the one or more scissor units and grasps a very small object by compressing the one or more scissor units. The re-configurable unmanned aerial vehicle can be compressed into a small form for storage purposes.

The re-configurable unmanned aerial vehicle enables proper placement of the payload and also facilitates to operate starting from autonomously picking up the payload until its delivery at its preferred location. The re-configurable unmanned aerial vehicle also auto-center the Center of Mass (COM) of the payload without any human intervention resulting in a rapid and efficient process respectively. The re-configurable unmanned aerial vehicle can be used in defense during emergency military operations where crates of various shapes and sizes can be picked and transported to front lines without any human intervention. The re-configurable unmanned aerial vehicle accommodates any kind of payload without having to re-design the vehicle for different purposes. There is no longer a need an additional gripping mechanism as the re-configurable unmanned aerial vehicle chassis re-configures accordingly to grip the payload with the locking mechanism.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for an unmanned aerial vehicle that re-configures its shape in real-time based on a shape and size of a payload to perform payload delivery efficiently. Referring now to the drawings, and more particularly to FIG. 1 through FIG. 6, where similar reference characters denote corresponding features consistently throughout the figures, preferred embodiments are shown.

Figure 1:
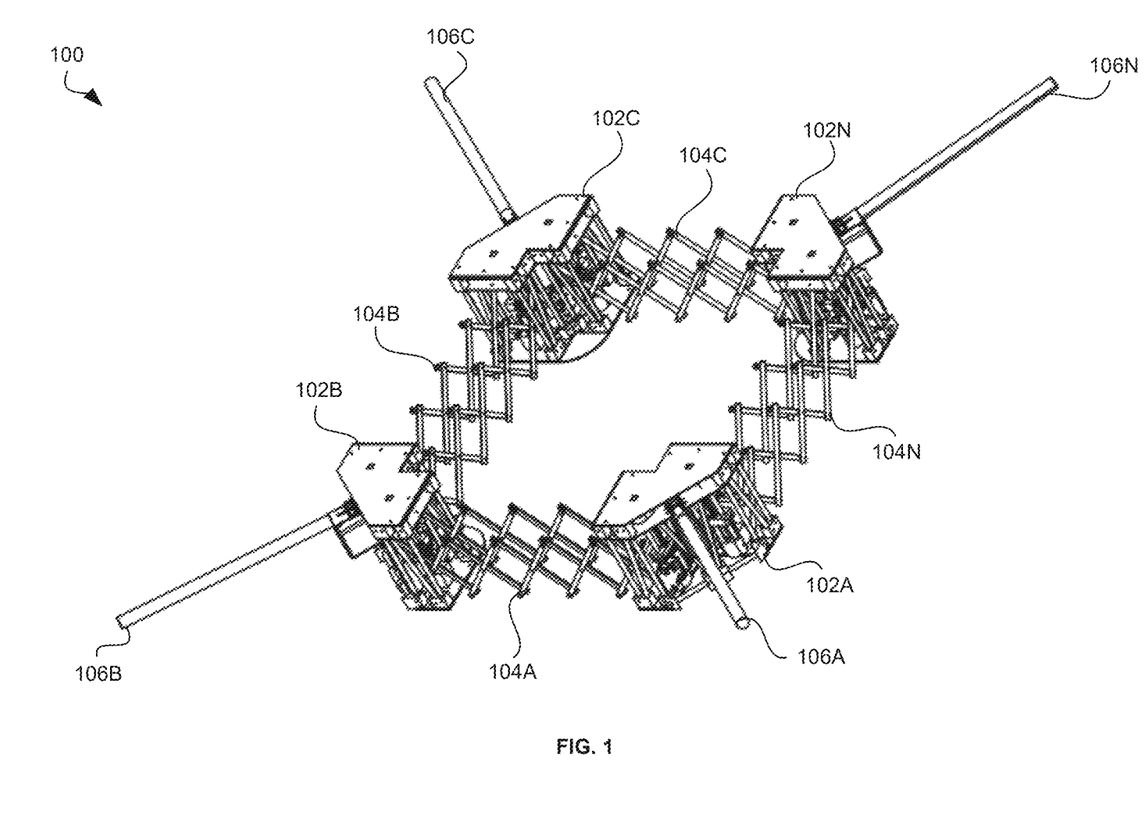
FIG. 1 illustrates a schematic diagram of a re-configurable unmanned aerial vehicle, according to some embodiments herein.

FIG. 1 illustrates a schematic diagram of a re-configurable unmanned aerial vehicle 100, according to some embodiments herein. The re-configurable unmanned aerial vehicle 100 includes one or more rotor units 102A-N, one or more scissor units 104A-N, and one or more pipes 106A-N. The one or more rotor units 102A-N include one or more battery slots. In some embodiments, each of the one or more battery slots includes a battery that supplies power to the one or more rotor units 102A-N. The battery may be at least one of a Lithium-ion battery or a Lithium polymer battery. In some embodiments, the one or more rotor units 102A-N include a communication module that enables the re-configurable unmanned aerial vehicle to communicate vehicle data to a remote device and receive commands from the remote device. The remote device may be any of a personal computer, a mobile phone, a tablet, or a digital assistant device. In some embodiments, the vehicle data includes position data and vehicle formation data.

A scissor unit 104A may join adjoint with rotor units 102A and 102B. The one or more rotor units 102A-N may be placed at corners of the re-configurable unmanned aerial vehicle 100. The one or more scissor units 104A-N that are connected with the one or more rotor units 102A-N, adjusts a length and an orientation of the re-configurable unmanned aerial vehicle 100 based on a shape and a size of the payloads. One end of the scissor unit 104A may be connected to the rotor unit 102A, another end of the scissor unit 104A may be connected to the rotor unit 104B. The payload may be a square-shaped payload or a rectangular-shaped payload.

The length of the one or more scissor units 104A-N may be changed using a linear actuator for an elongation process or a compression process of the one or more scissor units 104A-N. The one or more scissor units 104A-N are configured to perform at least one of elongation or compression of the one or more scissor units 104A-N to fit the payloads within the re-configurable unmanned aerial vehicle 100 using a scissor mechanism. In some embodiments, the one or more scissor units 104A-N are made of high-grade carbon fibre sheets. In some embodiments, the re-configurable unmanned aerial vehicle 100 performs at least one of the elongation or the compression of the one or more scissor units 104A-N based on the commands received on the communication module.

The one or more pipes 106A-N include one or more brushless Direct Current (DC) motors 108A-N and one or more propellers 110A-N to deliver the payloads from a first location to a second location in real-time. The one or more pipes 106A-N may be carbon fibre pipes. The one or more brushless DC motors 108A-N and the one or more propellers 110A-N may be attached to an end of each of the one or more pipes 106A-N. The one or more pipes 106A-N are inserted at an outer corner of each of the one or more rotor units 102A-N. In some embodiments, the brushless DC motors 108A-N and the one or more propellers 110A-N are arranged co-axially.

In some embodiments, the one or more rotor units 102A-N include a flight controller and a parachute system. A rotor unit 102A including the flight controller and the parachute system may be distributed among the other rotor units 102B-N. The flight controller controls the re-configurable unmanned aerial vehicle 100 based on the commands received from the remote device. In some embodiments, the flight controller is configured to control the re-configurable unmanned aerial vehicle 100 to correctly land on the first location, enables the one or more scissor units 104A-N to at least one of elongate or compress to fit the payload within the re-configurable unmanned aerial vehicle 100, and takes off to the second location for delivering the payloads. The parachute system expels a parachute doting fall and ensures a safe landing of the re-configurable unmanned aerial vehicle 100 in case of any environmental issues.

In some embodiments, the one or more rotor units 102A-N include a camera that is configured to analyse at least one of a position of the payload, a length of the payload, or a breadth of the payload. The re-configurable unmanned aerial vehicle 100 enables the one or more scissor units 104A-N to adjust the length and the orientation based on the analysed position, length, and breadth of the payload. The camera may be a complementary metal-oxide-semiconductor (CMOS) camera. In some embodiments, the CMOS camera includes CMOS sensors that create images in the CMOS camera. The rotor unit 102A including the camera may be distributed among the other rotor units 102B-N. In some embodiments, the camera analyzes the environment of the first location to identify the exact position and dimensions of the payload.

The one or more rotor units 102A-N may include a Global Positioning System (GPS) module to compute position data and time data of a place on the Earth. In some embodiments, the one or more rotor units 102A-N include a Real-Time Kinematic (RTK) system to enhance a precision of the position data derived from a satellite-based positioning system. The satellite-based positioning system may be a Global Navigation Satellite Systems (GNSS), that includes the GPS.

The rotor unit 102A including the GPS may be distributed among the other rotor units 102B-N. The rotor unit 102A including the flight controller, the parachute system, the camera, and the GPS module or the RTK system may be distributed among the flight controller, the parachute system, the camera, and the GPS module or the RTK system of the other rotor units 102B-N. The flight controllers, the parachute system, the camera, and the GPS module or the RTK system may be present on any of the one or more rotor units 102A-N.

In some embodiments, communication happens between the one or more rotor units 102A-N using at least one of a Serial Peripheral Interface (SPI) or an Inter-Integrated Circuit (I2C) protocol. In some embodiments, wiring between any two rotor units in the one or more rotor units 102A-N goes through the one or more scissor units 104A-N. In some embodiments, different lengths of the one or more scissor units 104A-N are achieved by the linear actuator. In some embodiments, the linear actuator includes a sliding mechanism.

The re-configurable unmanned aerial vehicle 100 approaches the payload and hovers on top of it. The camera inside any of the one or more rotor units 102A-N analyses at least one of the position of the payload, the length of the payload, or the breadth of the payload before landing. The re-configurable unmanned aerial vehicle 100 enables the one or more scissor units 104A-N to adjust the length and the breadth of the one or more scissor units 104A-N based on the size and shape of the payload and fits the payload within the re-configurable unmanned aerial vehicle 100. In some embodiments, the re-configurable unmanned aerial vehicle 100 includes a locking mechanism that holds the one or more scissor units 104A-N after achieving the desired length for fitting the payload within the reconfigurable unmanned aerial vehicle 100. The one or more scissor units 104A-N compress to hold the payload firmly and locks from expanding with the locking mechanism.

The re-configurable unmanned aerial vehicle 100 may land when the payload comes within the vicinity of the re-configurable unmanned aerial vehicle 100 and enables the one or more scissor units 104A-N to to expand (i.e. elongation) to its fullest. After the payload is placed, the one or more scissor units 104A-N fits (i.e. compression) the payload within the re-configurable unmanned aerial vehicle 100. The re-configurable unmanned aerial vehicle 100, when compressed, ensures that the payload rests on support plates of each of the one or more rotor units 102A-N. The re-configurable unmanned aerial vehicle 100 takes off carrying the payload from the first location and lands at the second location. In some embodiments, the re-configurable unmanned aerial vehicle 100 enables the one or more scissor units 104A-N to release the payload (i.e. expanding the one or more scissor units 104A-N) after reaching the second location, by using the scissor mechanism.

In some embodiments, when there is no payload, an angular spring in the middle of scissor joints in the one or more scissor units 104A-N collapses the one or more scissor units 104A-N to a home position. In some embodiments, a scissor unit of length m and several scissor pairs n, the range of scissor unit 104A is $[(n+1)*L*\cos 80°, (n+1)*L*\cos 10°]$.

Figure 2A:
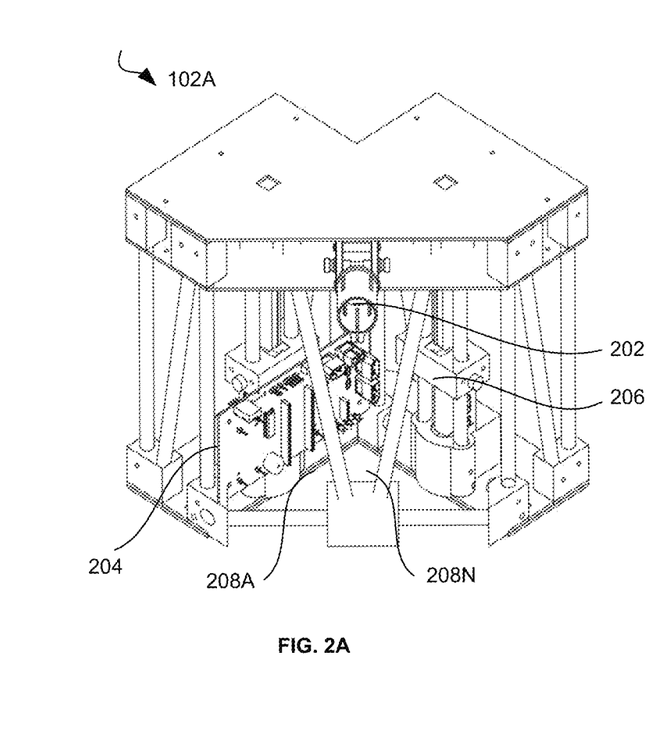
FIG. 2A illustrates an isometric front view of a rotor unit of the re-configurable unmanned aerial vehicle of FIG. 1, according to some embodiments herein.

FIG. 2A illustrates an isometric front view of the rotor unit 102A of the re-configurable unmanned aerial vehicle 100 of FIG. 1, according to some embodiments herein. The rotor unit 102A is connected to the one or more scissor units 104A-N. The rotor unit 102A includes an opening 202, a circuitry 204, a slider 206, and one or more trusses 208A-N. The opening 202 is for inserting the one or more pipes 106A-N with the rotor unit 102A. In some embodiments, the opening 202 is a folding arm holder. The circuitry 204 may be a Printed Circuit Board (PCB) for data logging the rotor unit 102A. In some embodiments, the circuitry 204 is the flight controller. In some embodiments, the circuitry 204 control operations of the rotor unit 102A. The slider 206 enables a sliding motion of the one or more scissor units 104A-N with the scissor mechanism, that enables at least one of elongation (expanding) or compression of the one or more scissor units 104A-N. The one or more trusses 208A-N is a framework that is configured to provide structural strength to the rotor unit 102A.

In some embodiments, the rotor unit 102A may include, the flight controller, the parachute system, the camera, the GPS module, or the RTK system, for controlling the re-configurable unmanned aerial vehicle 100. In some embodiments, the GPS module includes a GPS receiver, which uses a constellation of satellites and ground stations to compute position data and time data of a place on the Earth. The GPS receiver may calculate the position and time of the place where the payload is located with the position data and the time data of the place on the Earth.

Figure 2B:
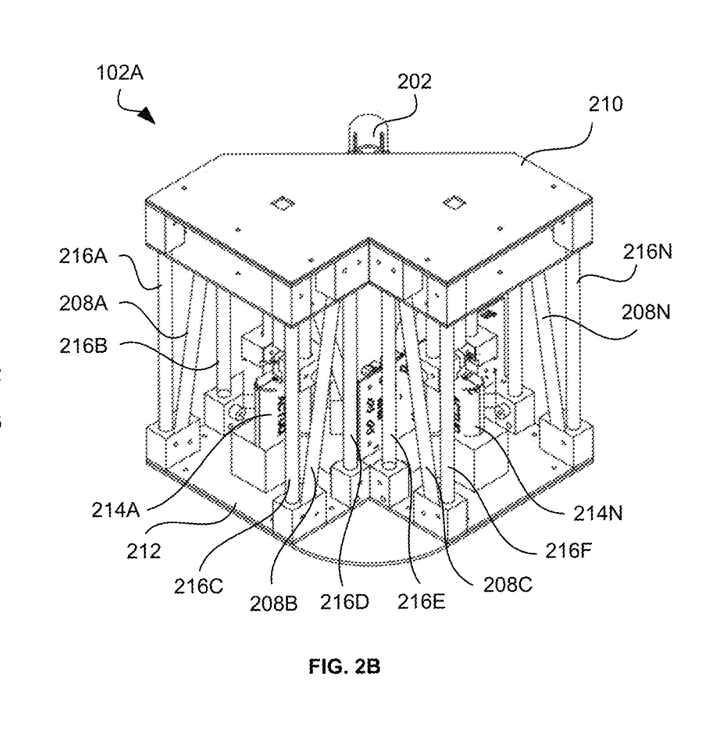
FIG. 2B illustrates an isometric back view of the rotor unit of the re-configurable unmanned aerial vehicle of FIG. 1, according to some embodiments herein.

FIG. 2B illustrates an isometric back view of the rotor unit 102A of the re-configurable unmanned aerial vehicle 100 of FIG. 1, according to some embodiments herein. The rotor unit 102A includes the one or more trusses 208A-N, a top plate 210, a base plate 212, one or more actuators 214A-N, and one or more columns 216A-N. The base plate 212 is configured to provide support for the payload during delivery of the payload. In some embodiments, the base plate 212 is a support plate. In some embodiments, the payload rests on the base plate 212. In some embodiments, the base plate 212 is a carbon fiber plate. The one or more actuators 214A-N are configured to control the length of the one or more scissor units 104A-N. The one or more trusses 208A-N and the one or more columns 216A-N provide support to the rotor unit 102A. In some embodiments, the one or more columns 216A-N are made up of carbon fibre. In some embodiments, the rotor unit 102A includes a curvature that enables the payload to hold on the re-configurable unmanned aerial vehicle 100 with a better grip. In some embodiments, an angle of the curvature is in a range of 30 degrees to 80 degrees. The functions and explanations of the rotor unit 102A are explained above.

Figure 3:
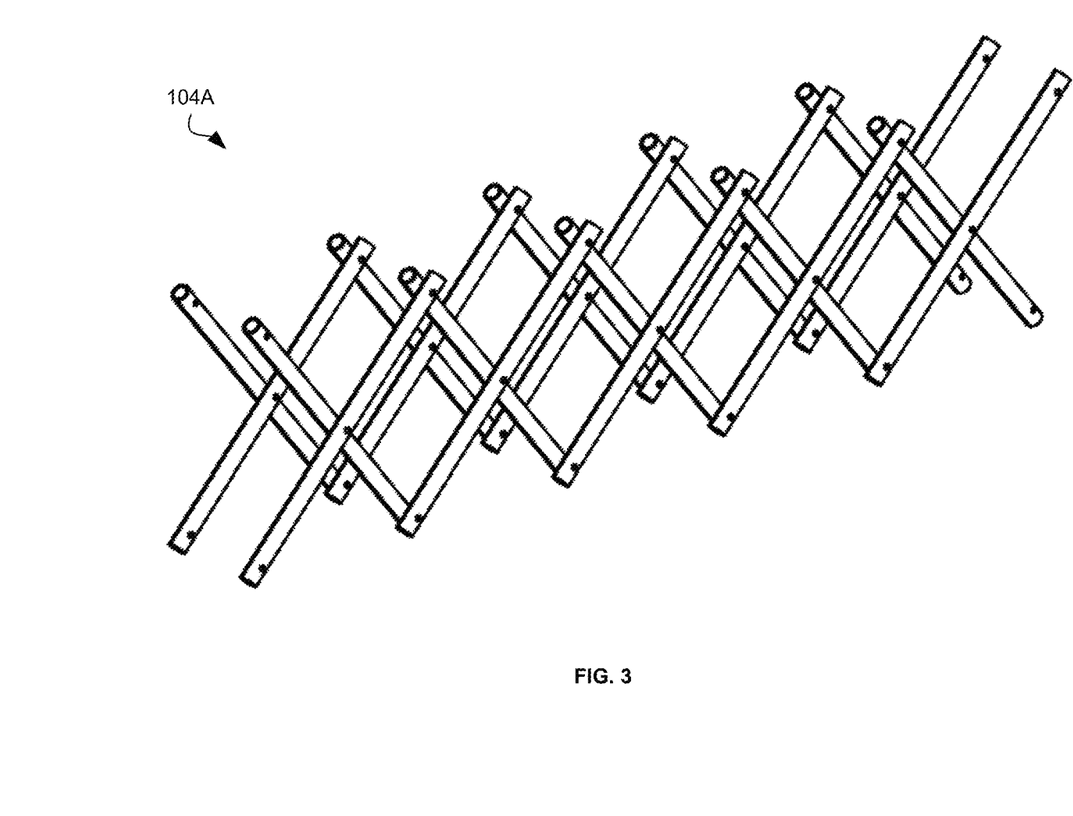
FIG. 3 illustrates an isometric view of a scissor unit of the re-configurable unmanned aerial vehicle of FIG. 1, according to some embodiments herein.

FIG. 3 illustrates an isometric view of the scissor unit 104A of the re-configurable unmanned aerial vehicle 100 of FIG. 1, according to some embodiments herein. The scissor unit 104A includes one or more scissor mechanisms that are placed parallel. The end of the scissor unit 104A is configured to connect with the rotor unit 102A. In some embodiments, a top part of the scissor unit 104A is configured to connect with the actuator, and a bottom part of the scissor unit 104A is configured to connect with a scissor unit connector of the one or more trusses 208A-N. The length of the scissor unit 104A is actuated using the linear actuator for at least one of the elongation process or the compression process of the scissor unit 104A. In some embodiments, different lengths of the scissor unit 104A are achieved by the scissor unit 104A with the scissor mechanism.

The wiring may be placed inside the scissor unit 104A to communicate between the adjacent rotor units 102A, 102B with at least one of the Serial Peripheral Interface (SPI) or the Inter-Integrated Circuit (I2C) protocol.

Figure 4:
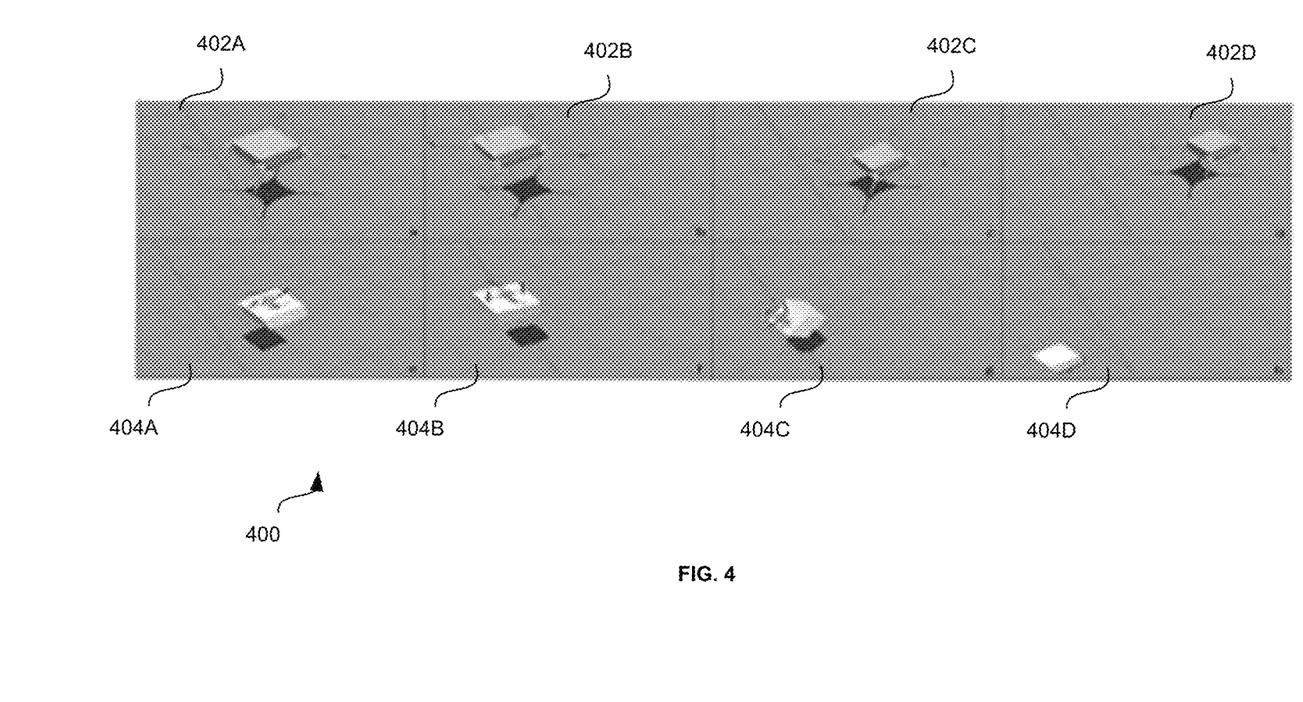
FIG. 4 illustrates a user interface of simulation of the re-configurable unmanned aerial vehicle with a quadrotor, according to some embodiments herein.

FIG. 4 illustrates a user interface 400 of simulation of the re-configurable unmanned aerial vehicle 100 with a quadrotor, according to some embodiments herein. The simulation includes the re-configurable unmanned aerial vehicle 100 and the quadrotor with a square-shaped payload of mass 1 kg. The square-shaped payload maybe with a length of 0.55 m and a breadth of 0.55 m. The quadrotor may be a Pelican quadrotor, The user interface 400 includes one or more simulation images 402A-D of the re-configurable unmanned aerial vehicle 100, and one or more simulation images 404A-D of the quadrotor. The one or more simulation images 402A-D of the re-configurable unmanned aerial vehicle 100 shows the aggressive manoeuvres performed by the re-configurable unmanned aerial vehicle 100, and the one or more simulation images 404A-D of the quadrotor shows crashes by performing the aggressive manoeuvres.

Figure 5A:
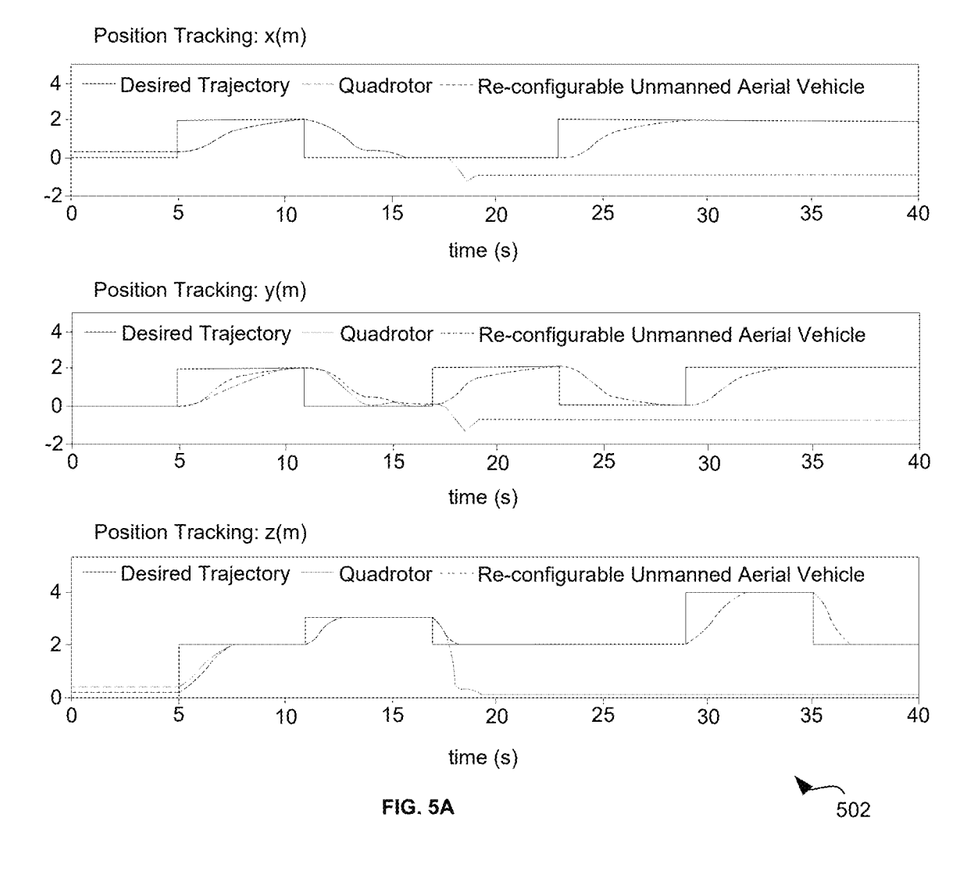
FIGS. 5A-5C illustrate graphical representations of tracking comparison for a square-shaped payload of the re-configurable unmanned aerial vehicle with the quadrotor, according to some embodiments herein.
Figure 5B:
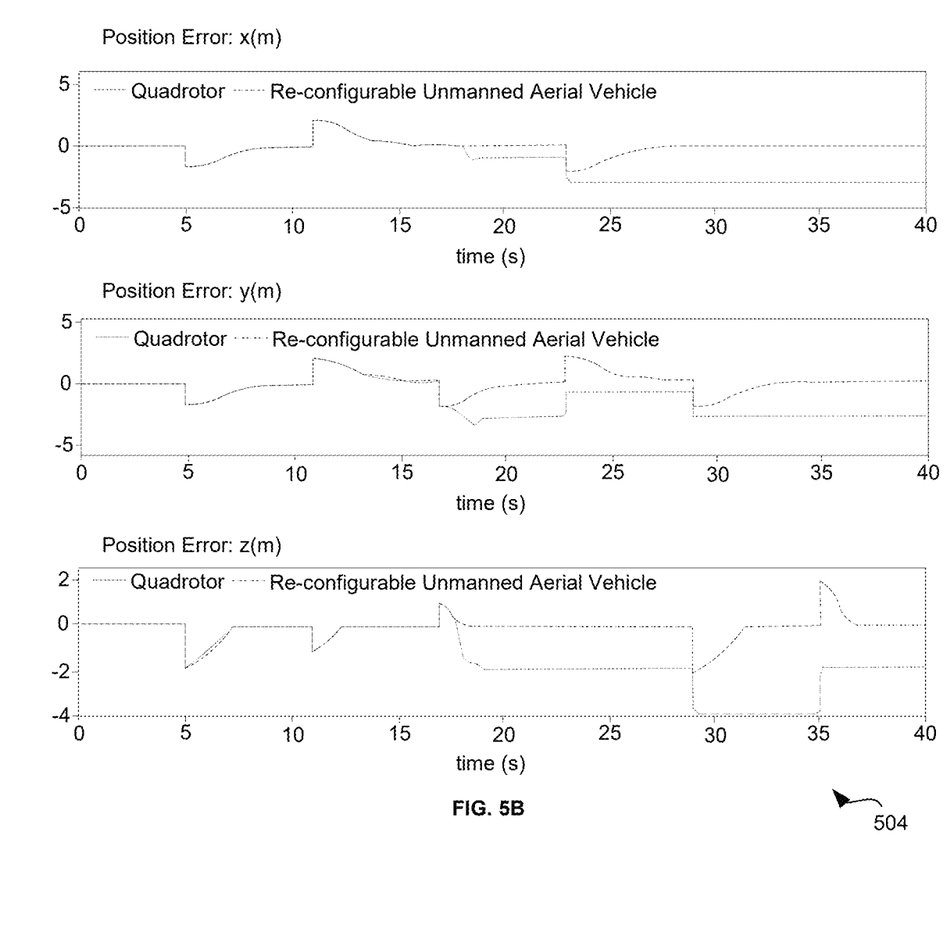
Figure 5C:
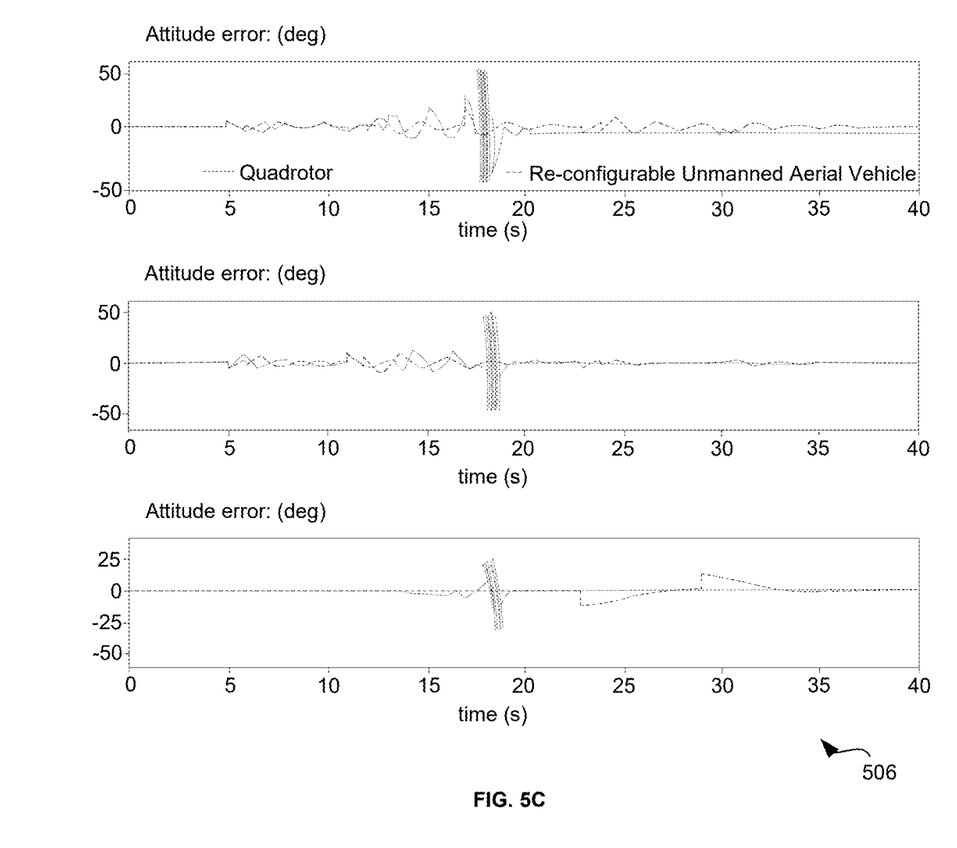

FIGS. 5A-5C illustrate graphical representations of tracking comparison for the square-shaped payload of the re-configurable unmanned aerial vehicle 100 with the quadrotor, according to some embodiments herein. FIG. 5A depicts a graphical representation 502 of a position trajectory for the square-shaped payload for the re-configurable unmanned aerial vehicle 100 and the quadrotor. The graphical representation 502 includes position tracking in x-direction, y-direction, and z-direction. A constant line after t=18 s shows the crash of the quadrotor and the re-configurable unmanned aerial vehicle 100 shows improved position trajectory tracking for the square-shaped payload with a desired trajectory.

FIG. 5B depicts a graphical representation 504 of a position tracking performance for the square-shaped payload for the re-configurable unmanned aerial vehicle 100 and the quadrotor. The graphical representation 504 includes position errors in x-direction, y-direction, and z-direction. The re-configurable unmanned aerial vehicle 100 shows improved position tracking performance for the square-shaped payload.

FIG. 5C depicts a graphical representation 506 of an attitude tracking performance for the square-shaped payload for the re-configurable unmanned aerial vehicle 100 and the quadrotor. The graphical representation 506 includes attitude error in $\varphi$ (phi) degree, $\theta$ (theta) degree, and $\psi$ (psi) degree, The re-configurable unmanned aerial vehicle 100 shows improved attitude tracking performance for the square-shaped payload.

The re-configurable unmanned aerial vehicle 100 shows the improved position trajectory tracking, the position tracking performance, and the attitude tracking performance also for the rectangular-shaped payload of 1 kg without Centre of Mass (COM) mismatch. The rectangular-shaped payload maybe with a length of 0.55 m and a breadth of 0.33 m.

Figure 6:
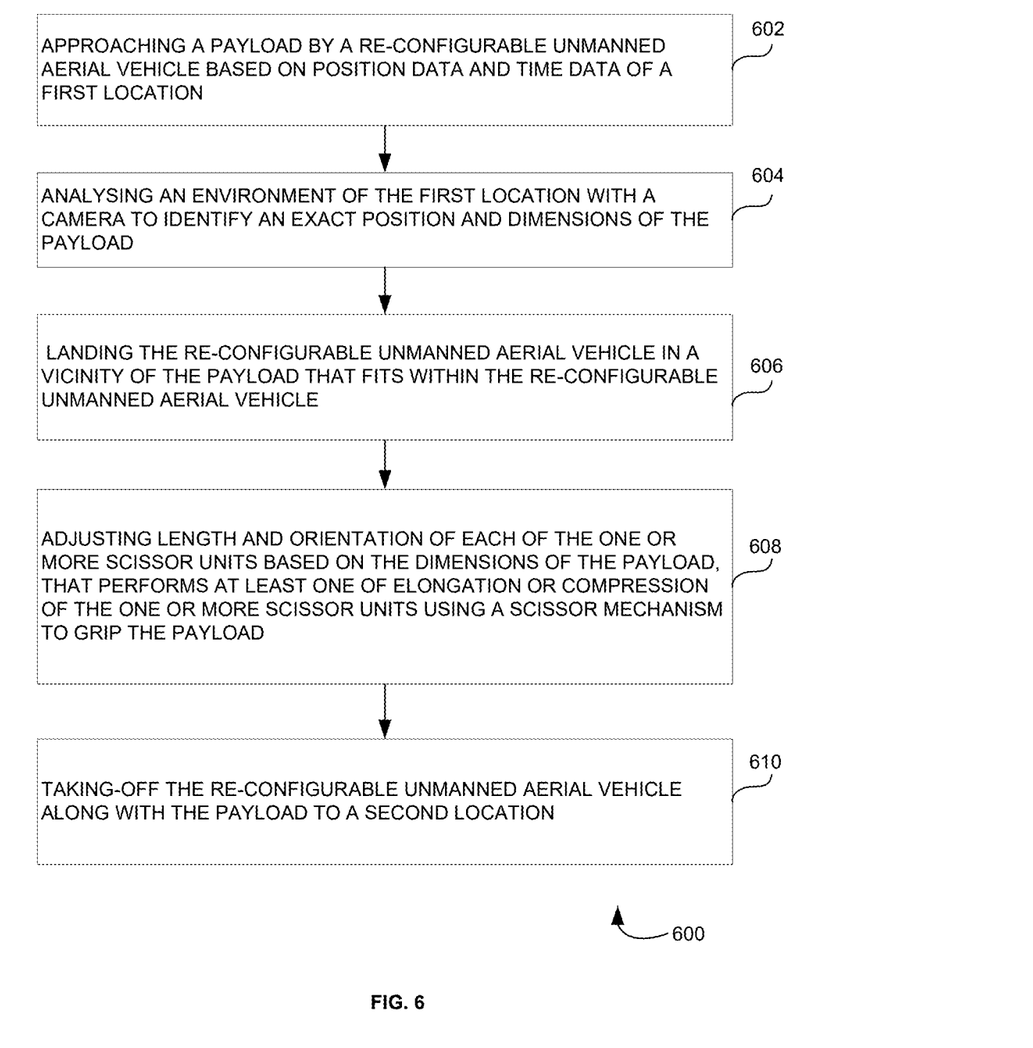
FIG. 6 is a flow diagram that illustrates a method of carrying a payload efficiently using the re-configurable unmanned aerial vehicle of FIG. 1, according to some embodiments herein.

FIG. 6 is a flow diagram that illustrates a method 600 of carrying the payload efficiently using the re-configurable unmanned aerial vehicle 100 of FIG. 1, according to some embodiments herein. At step 602, the payload is approached by the re-configurable unmanned aerial vehicle 100 based on the position data and time data of the first location. At step 604, the environment of the first location is analyzed with the camera to identify the exact position and dimensions of the payload. At step 606, the re-configurable unmanned aerial vehicle 100 is landed in the vicinity of the payload that fits within the re-configurable unmanned aerial vehicle 100. At step 608, the length and the orientation of each of the one or more scissor units 104A-N are adjusted based on the dimensions of the payload, which performs at least one of the elongation or the compression of the one or more scissor units 104A-N using a scissor mechanism to grip the payload. In some embodiments, an user can place the payload on the re-configurable unmanned aerial vehicle. At step 610, the re-configurable unmanned aerial vehicle 100 takes off along with the payload to the second location.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A re-configurable unmanned aerial vehicle that re-configures its shape and Centre of Mass (COM) based on a shape and a size of payload for delivering the payload in real-time, wherein the re-configurable unmanned aerial vehicle comprises, two or more scissor units attached at an adaptive angle and are connected with one or more rotor units; and one or more pipes that are inserted at an outer corner of each of the one or more rotor units, wherein the one or more rotor units comprise a slider, a camera, one or more actuators, and one or more trusses wherein the camera is configured to (i) analyze an environment of a first location by capturing images and (ii) identify a position, orientation and dimensions of the payload in the first location to transmit to the one or more actuators, wherein the one or more pipes comprise one or more brushless Direct Current (DC) motors and one or more propellers to deliver the payload from the first location to a second location, wherein the one or more actuators are configured to connect with a top part of the two or more scissor units to control a length of the two or more scissor units, and the one or more trusses are configured to connect with a bottom part of the two or more scissor units to provide structural strength to the one or more rotor units, wherein, when the re-configurable unmanned aerial vehicle hovers on top of the payload, and identifies the position, orientation, and dimensions of the payload, the re-configurable unmanned aerial vehicle is configured to:

enable, using the one or more actuators, the two or more scissor units to perform any of the elongation or the compression using a sliding motion of a scissor mechanism, based on the dimensions of the payload to reconfigure the shape of the re-configurable unmanned aerial vehicle land the re-configurable unmanned aerial vehicle in a vicinity of the payload based on the identified position of the payload enable, using the one or more actuators, the two or more scissor units to adjust the length based on the size and the shape of the payload to fit and grip the payload while maintaining the COM within the re-configurable unmanned aerial vehicle, and take off with the payload to deliver the payload from the first location to the second location.

2. The re-configurable unmanned aerial vehicle of claim 1, wherein each of the one or more rotor units comprise any of: a flight controller, a parachute system, the camera, a Global Positioning System (GPS) module, or a Real-Time Kinematic (RTK), that distributes among the one or more rotor units, to control the re-configurable unmanned aerial vehicle.

3. The re-configurable unmanned aerial vehicle of claim 2, wherein the camera is configured to analyze at least one of a position of the payload, a length of the payload, or a breadth of the payload when the re-configurable unmanned aerial vehicle approaches the payload.

4. The re-configurable unmanned aerial vehicle of claim 1, wherein the-re-configurable unmanned aerial vehicle further comprises one or more linear actuators to control the length of the two or more scissor units using the scissor mechanism.

5. The re-configurable unmanned aerial vehicle of claim 1, wherein the re-configurable unmanned aerial vehicle is configured to reconfigure into one or more different shapes to match with the shape and the size of the payload using degrees of freedom in changing the length of the two or more scissor units.

* * * * *